April 26, 1949.  E. R. WILLARD  2,468,582
COMPUTER
Filed March 11, 1946  3 Sheets-Sheet 1

April 26, 1949.　　　　　E. R. WILLARD　　　　　2,468,582
COMPUTER

Filed March 11, 1946　　　　　　　　　　　　　3 Sheets-Sheet 3

INVENTOR.
Edwin R. Willard
BY
Munn, Liddy, Glaccum & Rich
Attys.

Patented Apr. 26, 1949

2,468,582

UNITED STATES PATENT OFFICE 2,468,582

COMPUTER

Edwin R. Willard, Arlington, Va.

Application March 11, 1946, Serial No. 653,620

2 Claims. (Cl. 235—84)

My present invention has for its object to provide a slide rule of circular form having interrelated scales graduated in accordance with mathematical principles, making it a graphical application by which computations generally used by members of the engineering profession may be computed. Generally stated, I accomplish this by locating certain of the scales upon one or both faces of a disc and others upon a rotary adjustable ring with both of which elements a cursor or indicator cooperates having hair lines registering with the graduations of the several scales.

Another object of my invention is to assemble the several scales so that some read in a clockwise direction while others read in counterclockwise direction and laying some of them out in spiral form to accomplish continuity in lieu of independent circular scales.

Still another object of my invention is the incorporation of fixed gauge points with reference to certain of the scales for converting degrees of angles to radians and vice versa and other gauge marks for determining functions of angles less than 1° and designated in seconds, minutes and decimals of a degree and for converting minutes or seconds to decimal parts of a degree.

Another feature of my invention comprehends the coordinated arrangement of suitable scales on both sides of the disc and ring whereby many calculations involving multiplication, division, raising powers, root extraction, exponential equations, trigonometric formulas and hyperbolic functions may be solved directly on the instrument by a single setting of the movable parts and read directly under the cursor or indicator hair lines or opposite the indices.

Additional features of my invention embody the mechanical assembly of the disc within the ring by means of which a constant uniform friction is maintained between them which is not affected by atmospheric changes and which serves to secure them against accidental displacement when one part is adjusted relative to the other.

Still another feature of the invention resides in the manner in which the cursor is secured relative to the scales on the ring and which is releasable to permit its ready adjustment circumferentially on the instrument.

To these and other ends my invention embodies further improvements, all of which will be fully described in the accompanying specification, the novel features thereof being set forth in the appended claims.

In the drawings.

Similar reference numerals in the several figures indicate similar parts.

Figure 9:
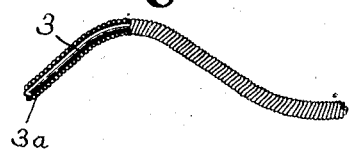
Figure 9 is a detail view of a section of a suitable wire wound serpentine spring for securing the disc and ring together.

In carrying out my invention I provide a disc 1 of a convenient diameter surrounded by a ring 2 of comparable width. The contiguous peripheries of these parts are provided with annular grooves which are in register with each other throughout and preferably, but not necessarily, of equal depth in the respective parts. As a means of securing the disc permanently within the ring and providing sufficient frictional engagement to enable one of the parts to be rotated freely with reference to the other but to measurably restrain such movement against accidental displacement, I mount within the channels a serpentine spring wire or spline 3. The latter is preformed with lateral bends so as to provide an equal number of bearing points against the bottoms of the grooves in the two parts. If desired the spline 3 may be made in the form of a cable consisting of a fine wire 3ª closely wound on a flexible preformed serpentine core as shown in Fig. 9. The assembly of the three above mentioned elements is accomplished by laying the bent wire in the groove of the ring and compressing it with a mandrel equal in circumference to the disc. The latter is placed on the mandrel and pushed into the ring thus displacing the mandrel therefrom. When the faces of the disc are flush with those of the ring the spring 3 snaps into its groove and the two parts are firmly locked together in the same plane.

The disc 1 and ring 2 may be made of any suitable material preferably either Dow metal or aluminum because these are dimensionally stable, are very light in weight and give a good background contrast with the scale markings. If it is desired to use another substance I recommend Vinylite, a white opaque plastic, or an equivalent material which is dimensionally stable and is not subject to atmospheric changes.

The cursor, which corresponds to the runner of an ordinary slide rule, comprises two transparent arms 4 and 5 embracing the front and rear sides of the disc and ring and is pivoted at the center of the disc. They are secured together at their outer ends at opposite sides of a hollow block 6 and each has a centrally located hairline 4ª and 5ª, respectively, which lie in a common plane extending radially of the axis of the disc. Along the edges of the cursor blades are suitable designations corresponding to the scale markings on the two faces of the disc and ring with which they cooperate.

Within the block 6 I mount a friction shoe 7 curved on its inner face to fit the circumference of the ring 2 against which it is normally held by spring action such as two coil springs 8. These springs bear against the rear end faces of the shoe and the inner wall of the block recess and exert sufficient force to securely hold the cursor against accidental movement from any position in which it may be set. In order to provide for the ready release of the shoe 7 I form at its center a yoke 9 having an elongated slot 10 containing a steel ball 11 which may be held in a forward position by a leaf spring 12 positioned between it and the rear end of the slot, although such spring is not necessary.

Only a very slight retracting movement need be imparted to the brake shoe 7 to permit an adjusting movement of the cursor and to accomplish this I provide independently movable release buttons operable from either side of the cursor. To this end the blades 4 and 5 are provided with alined apertures registering with the slot 10 slightly ahead of the ball 11.

Extending through and guided in the aforementioned apertures are plungers 15 and 16 having bevel edges normally resting in contact with the opposite sides of the off-center face of the ball 11. Small flanges 15ª—16ª on the plungers engaging the inner surfaces of the blades 4 and 5 hold them in the position indicated by reason of the spring 12 which yieldingly holds the ball in engagement with the plungers. If desired, a small spring may be also placed between the plungers to hold them in their inoperative position. The plungers may be held in alinement and guided by a small post 18 mounted on one of them and arranged with its free end guided in a recess in the other. As an operating convenience the plungers are each provided with broad heads. It will be appreciated from the described arrangement of the parts that the operator may readily unlock the cursor by depressing whichever plunger is most accessible according to which side of the instrument he may be using at the moment or he may depress them simultaneously.

Figure 3:
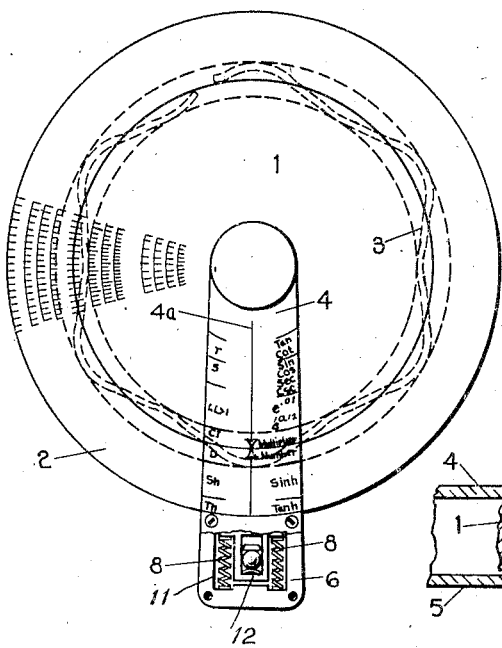
Figure 3 is a view similar to Fig. 1 showing one of the pair of cursors which cooperates with the scales on the disc and ring and in dotted lines the arrangement of the mechanical element by which the disc and ring are held together in frictional engagement.
Figure 7:
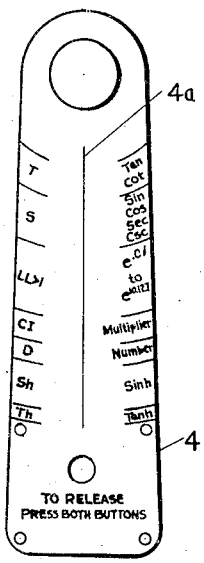
Figures 7 and 8 are enlarged views of the two faces of the cursor showing the reference thereon which designate the respective scales on the obverse and reverse sides of the disc and ring and the hair lines which cooperate therewith.
Figure 6:
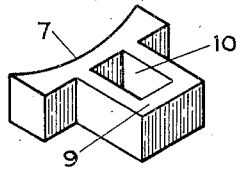
Figure 6 is a detail perspective view of the brake shoe.

The cursor 4 on the forward or obverse side of the instrument is shown particularly in Figs. 3 and 7 and along its left hand margin there are depicted lineally the indications corresponding to the scales found on the front face of the disc and ring. Lineally disposed on the right hand margin are indicative references to the resultants and uses that may be determined by the use of said scales.

Figure 4:
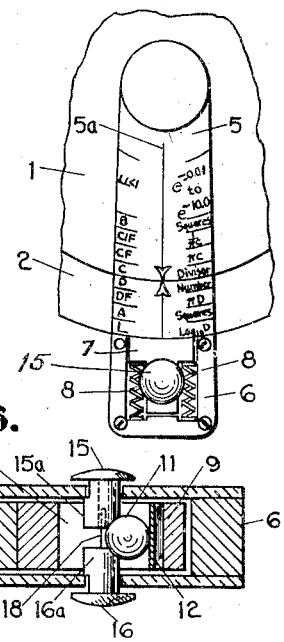
Figure 4 is a detail view of the cursor.
Figure 5:
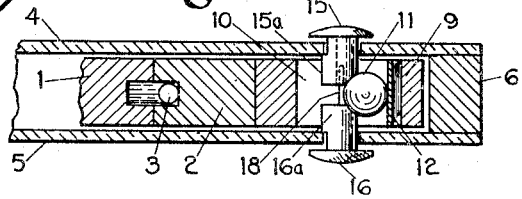
Figure 5 is an enlarged central sectional view of the outer end of the cursor, the joint between the rim of the disc and the surrounding ring together with the brake shoe and its operating devices.
Figure 8:
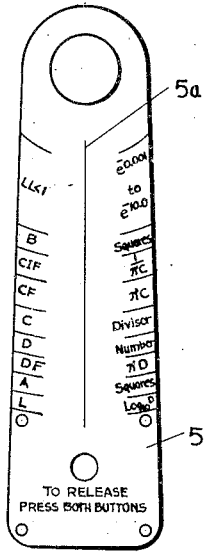

The markings on the cursor 5 on the other or reverse side of the disc and ring are likewise shown along the left and right hand edges of this part which is shown more particularly in Figs. 4 and 8.

Figure 1:
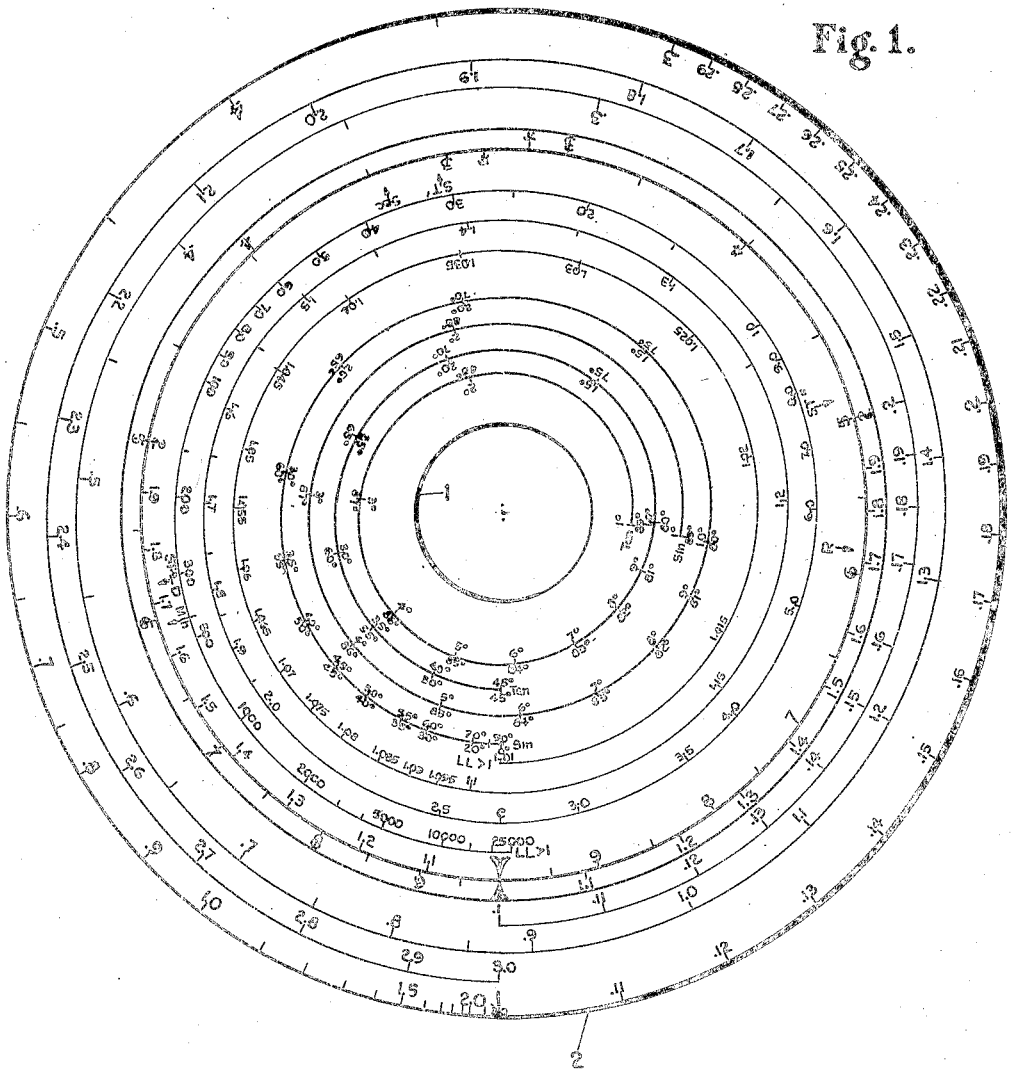
Figures 1 and 2 are plan views of the two faces of the instrument embodying my invention, the cursor being omitted so as not to obscure any of the graduations of the various scales.

Referring particularly to Figs. 1 and 7 the scales shown are arranged as indicated and are to be read with reference to the cursor and other scales in the directions indicated to give the resultants obtainable as follows:

Scale T.—A spiral of two coils. Reads counterclockwise graduated to give tangents and cotangents for angles from 1° to 89°.

Scale S.—A spiral of two coils. Reads counterclockwise to give angular readings in degrees for determining sines and cosecants of angles from 1° to 90° and cosines and secants of angles from 0° to 89.

Scale LL>1.—A spiral of three coils. Reads counterclockwise. Contains log log graduations from 1.01 to 25000.

Scale CI.—Circular. Reads clockwise. Logarithmic divisions 1 to 10.

Scale D.—Circular. Reads counterclockwise. Logarithmic divisions 1 to 10.

Scale SH.—Spiral two coils. Reads counterclockwise. Graduations for sinh 0.1 to 3.0.

Scale Th.—Circular. Reads counterclockwise. Graduations for tanh 0.1 to 3.0.

For the purpose of determining the functions of angles less than 1° and designated in seconds, minutes or decimal parts of a degree I provide gauge marks ST'', ST' and ST·°. These are located on the front face of the disc between scales LL>1 and CI. ST·° and D will be found on the left hand side of Fig. 1, ST' at the left of the top of the figure and ST'' and R at the right. Gauge marks D and R just mentioned are used for converting degrees to radians and radians to degrees. Also indicated are gauge marks "Min." and "Sec." for converting minutes and seconds to decimal parts of a degree. "Min." is adjacent ST·° and gauge mark D. "Sec." is adjacent to "ST'."

Figure 2:
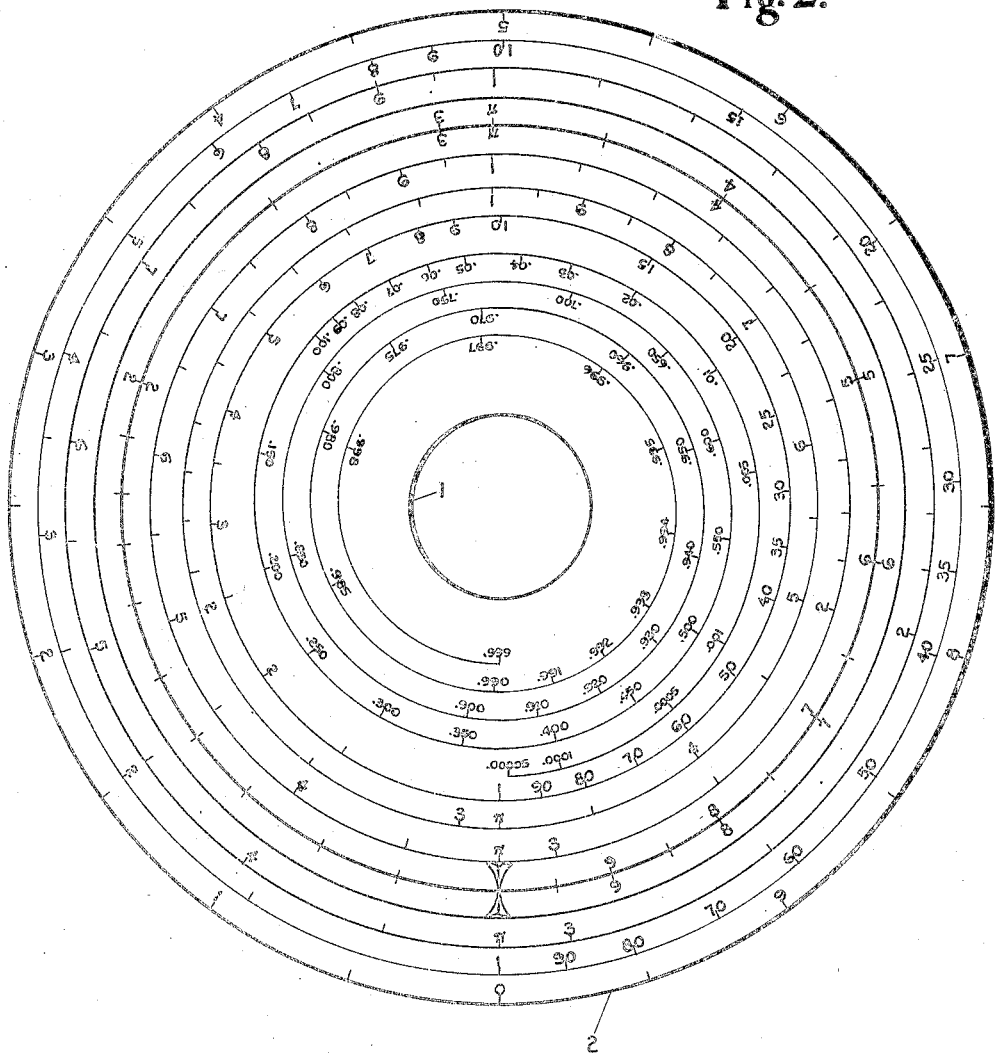

The indications on the reverse side of the instrument shown in Fig. 2 may likewise be set forth in conjunction with Figs. 4 and 8, as follows:

Scale LL<1.—A four coil spiral. Reads clockwise. It has log log graduations 0.999 to 0.00005.

Scale B.—Circular. Reads clockwise. It has logarithmic divisions of two units length of 1–100.

Scale CIF.—Circular. Reads counterclockwise. It has logarithmic divisions of full length from 1 to 10. It is offset from major scales by the amount of π.

*Scale CF.*—Circular. Reads clockwise. It has logarithmic divisions from 1 to 10. It is also offset from major scale C by the amount of $\pi$.

*Scales C and D.*—Circular. Major scales read clockwise. They have logarithmic divisions from 1 to 10.

*Scale DF.*—Circular. Reads clockwise. It has logarithmic divisions from 1 to 10. It is offset from major scale D by the amount of $\pi$.

*Scale A.*—Circular. Reads clockwise. It has logarithmic divisions of two units lengths from 1–100.

*Scale L.*—Circular. Reads clockwise. It is a scale of equal parts from 0 to 10.

The hair lines 4$^a$ and 5$^a$ on the indicator arms are accurately positioned in the same plane extending radially from the axis of the instrument and the several scales on the two sides of the disc and ring elements are likewise so positioned relatively to permit coordination of any reading on the disc with readings on the ring and for any reading on one face with readings on the other face. The starting points for all calculations on all of the scales are shown by the mating arrows on the outer rim of the disc 1 and the inner rim of the ring 2 on each of the faces of these parts are shown in the bottom central areas of Figs. 1 and 2.

It will be seen that the scales being logarithmic lengths of the numbers represented lend themselves to the mechanical combinations of logarithms as a result of which the operator may quickly and easily perform calculations involving multiplication, division, raising to powers, root extraction, exponential equations, trigonometric formulas and hyperbolic functions.

A further reference to the manner in which some of the scales are divided and their relative location to others will aid in understanding the manner of their conjoint use and I will therefore first refer to the scale D of Fig. 1. It is divided into nine principal parts numbered from 1 to 9, and these parts are numbered from 1 (arrow point) to 9, reading counterclockwise. These primary divisions are subdivided successively as follows: The first primary station (the first between 1 and 2) has divisions numbered from 1.1 to 1.9 each of which is again divided into ten equal parts.

Hence the unnumbered graduations, read under cursor hair line 4$^a$ will be read as one tenth (.1) of the secondary division. By continuing the same subdividing of the other primary stations around the circle it becomes possible to read such figures as 1.37; 2.01; 8.06. By mentally or otherwise positioning the decimal point said reading may become:

```
.00137      .00201      .0806
0.0137      0.0201      0.806
13.700      20.100      80.60
```

It will be observed that, irrespective of the setting between the disc and ring, all graduations that are opposite on the scales CI and D on the front face of the instrument have the same product and those on scales C and D on the reverse face have the same quotient.

In multiplying two numbers the hair line 4$^a$ is placed on one number on ring scale D, and the disc revolved to register the second number on scale CI with this hair line when the product will be indicated by the position of the index arrow of scale CI on scale D. To multiply three numbers the product of two of them is obtained as just described, the instrument being reversed the disc or ring are rotated in unison to set up the third factor on scale C in register with hair line 5$^a$. The three factor product will then appear beneath the hair line 5$^a$ on the reverse face scale D.

Division is preformed by a coordination of scales D and C on the reverse side of the instrument. The numerator is set up on the reverse face scale D and the denominator set on scale C whereupon the quotient will be indicated on scale D opposite the index arrow of scale C.

*Finding reciprocals.*—It will be apparent from the foregoing that when index on scale CI is opposite the index on scale D that reciprocals of all numbers on the latter will be found on the former. Also to find the reciprocal of a given number set up the number on scale C on the reverse side of the instrument opposite the index of scale D and read the reciprocal on scale D opposite the index of scale C.

An important feature of my invention is the manner in which the CF and DF scales are positioned or offset whereby multiplication and division involving the factor $\pi$ may be performed.

The scales CF and DF are the same as the scales C and D but I offset them by the amount of $\pi$ whereby the value of any graduation on scale CF becomes $\pi$ times that of the adjacent graduation on scale C. Likewise the value of a given graduation on scale DF is $\pi$ times the value of the adjacent position on scale D. Hence multiplication or division involving a multiplicity of factors one of which is $\pi$ may be performed as illustrated in the following examples:

(1) To multiply 6.3 by 4.1 by $\pi$.

On the reverse face set 6.3 on scale D to cursor hair line 5$^a$.

On scale CIF set 4.1 to hair line 5$^a$.

Observe index arrow of scale C and read 81.15 on scale D.

(2) To multiply 1.18 by 4.05 by 3.01 by $\pi$.

On obverse scale D set 1.18 on scale D to hair line 4$^a$ and set 4.05 on scale CI to hair line 4$^a$.

Release the indicator and turn the ring and disc in unison, setting 3.01 on reverse scale C to hair line 5$^a$ and read the resultant 45.19 on reverse scale DF.

(3) To divide 18.85 by 3 by $\pi$.

On the reverse face scale DF set 18.85 on hair line 5$^a$ and set 3 on scale C to hair line 5$^a$.

Observe the index arrow scale C and read the quotient 2 on scale D.

(4) To divide 20.8$\times\pi$ by 4.2$\times$3.6.

On the reverse face scale D set 20.8 to hair line 5$^a$.

On the reverse face scale C set 4.2 to hair line 5$^a$.

Release the indicator and turn the disc and ring in unison setting 3.6 on obverse face scales CI to hair line 4$^a$, beneath hair line 5$^a$ on reverse side of ring read 4.32 on scale DF.

The determination of ratios and proportions involves scales C and D or CF and DF on the reverse side of the instrument the relative positions of which are such that if the components of a known ratio in a proportion are set opposite each other on scales C and D, or CF and DF the unknown part will be found opposite the known part. For example if the value of "X" is sought in the ratio 5:X where an equal known ratio is 15:30, "X" may be determined as follows:

Set 30 on scale D to hair line 5ª.
Set 15 on scale C to hair line 5ª.
Opposite 5 on scale C read 10 on scale D.

The conversion of radians to degrees and vice versa are special cases involving a series of ratios and may be determined by the proportional ratio $\pi:180$. An additional feature of my invention is the incorporation with scales involved in such computations to provide special gauge points heretofore referred to as "R"; "D", "Sec." and "Min." which are matters of especial importance as will presently be seen.

For the purpose of converting radians to degrees the disc 1 is rotated to set gauge point R opposite any given value in radians indicated on scale D by hair line 5ª whereupon its value in degrees will be indicated by the index of scale CI on scale D. Similarly to convert degrees to radians the gauge point D may be set opposite any value in degrees on scale D. The resultant in radians will then be found on scale D opposite the index of scale CI.

Gauge points "Min." and "Sec." are used in converting minutes and seconds of an arc to decimal parts of a degree and their practical use is illustrated thusly: With gauge point "Min." set opposite a given value of minutes on scale D the equivalent in decimals will appear opposite the index of scale CI on scale D. Similarly to convert seconds to decimal points of a degree the point "Sec." is set opposite any value in seconds on scale D and the decimal equivalent will be found opposite the index of scale CI on scale D.

The scales LL>1 and LL<1 on opposite sides of disc 1 are used primarily for determining powers and roots and in carrying out my invention I make them in spirals of sufficient length to accommodate accurately readable log log graduations to coordinate with scales C and D the first being from 1.01 to 25000, the second from 0.999 to 0.00005. Said scales are used conjointly with scales D and C.

In further explanation of the advantages in the spiraling arrangement to give greater lengths to the scales LL<1 and LL>1 is found in their use when determining the powers less than unity and greater than unity, respectively. Positive powers of e (2.7183 approximately) may be found on scale LL>1 opposite the exponent on scale C and negative powers of e may be found on scale LL<1 opposite said exponent. It becomes apparent therefore that any proportion involving logarithms and numbers greater than unity or cologarithms and numbers less than unity may be handled in accordance with the proportion principle before explained.

Two other scales on the obverse face of disc 1 are made spirally, viz. T and S for use in calculations involving trigonometric functions and with these I proved the gauge points ST'', ST' and ST·°. The numerical values of all trigonometric functions are determined by using the scales T and S, the former for tangents, the latter for sines. For sines and tangents of angles of less than 1° said gauge points are used as points to be set under hair line 4ª when the latter registers with the angular value on scale D. Therefore, to find the sine or tangent of an angle measured in seconds the number of seconds on scale D is set to hair line 4ª and ST'' is brought to hair line. Opposite the index of scale CI the sine or tangent is read on scale D. If the angle is in minutes, the gauge point ST' is used. Likewise if the angle is indicated in decimals the gauge point ST·° is set to the hair line 4ª as previously adjusted to the angular value and the sine or tangent will be indicated on scale D.

Another scale not heretofore discussed and of spiral form is formed on the obverse face of ring 2 and denoted Sh. It reads counterclockwise and carries divisions from 0.1 to 3.0 and is useful in determining the hyperbolic sine for any hyperbolic angle X in conjunction with the adjacent scale D between the values 0.1 to 3.0.

The gauge marks hereto referred to are for determining the most commonly used ratios and for convenience in operating the instrument I locate with reference to scale CI. They therefore also have a definite location to scale D on the ring when this is mated with scale CI by bringing the index arrows of these two scales into register.

The method which I use in carrying out this feature of my invention for positioning of several conversion gauge marks can best be explained by the following tabulation:

| Gauge Mark | Conversion | Equivalent | Gauge Position Referred to Scale D (Normal) | Gauge Position Referred to Scale CI (Reciprocal) |
|---|---|---|---|---|
| R | Radians to Degrees. | $\frac{\pi}{180}$ | 17453 | 57297 |
| D | Degrees to Radians. | $\frac{180}{\pi}$ | 57297 | 17453 |
| Min | Minutes to decimal of a Degree. | $\frac{6}{10}$ | 60000 | 16667 |
| Sec | Seconds to decimal of a Degree. | $\frac{360}{10}$ | 36000 | 27778 |
| St·° | Sines or Tans of a Decimal part of a Degree. | $\frac{180 \times 10}{\pi}$ | 59297 | 17453 |
| ST' | Sines or Tans of Angular Minutes. | $\frac{180 \times 60}{\pi}$ | 34377 | 29089 |
| ST'' | Sines or Tans of Angular Seconds. | $\frac{180 \times 60 \times 60}{\pi}$ | 20626 | 48482 |

In connection with the above table of values it it noted that angles less than 1°, sin $\theta$ or tan $\theta$ equals $\theta$ in radians (approximately), therefore, $$\sin 1° = \frac{\pi}{180}; \sin .1° = \frac{\pi}{180 \times 10}; \sin 1' = \frac{\pi}{180 \times 60}$$

and $$\sin 1'' = \frac{\pi}{180 \times 60 \times 60}$$

I claim:

1. In a circular slide rule comprising a disc and surrounding ring, the combination with a cursor, of a brake shoe carried thereon and engaging the periphery of the ring having a slotted tail piece, springs located at opposite sides of the tail piece for yieldingly holding the shoe in engagement with the periphery of the ring, a ball in the slot and plunger having a cam surface engaging the forward side of the ball for releasing the brake shoe.

2. In a circular slide rule comprising a disc and surrounding ring, the combination with a cursor, of a brake shoe carried thereon and engaging the periphery of the ring having a tail piece provided with a slot, a spring pressing the shoe against the disc, a ball located in said slot, a separate spring for moving it in a forward direction and a pair of independently movable compression members engaging the forward side of the ball for retracting the brake shoe.

EDWIN R. WILLARD.

REFERENCES CITED

The following references are of record in the file of this patent:

UNITED STATES PATENTS

| Number | Name | Date |
|---|---|---|
| 769,044 | Anderson | Aug. 30, 1904 |
| 922,465 | Fenn | May 25, 1909 |
| 1,338,588 | Prescott | Apr. 27, 1920 |
| 1,849,058 | Dempster | Mar. 15, 1932 |
| 2,103,332 | Mayfield | Dec. 28, 1937 |
| 2,358,856 | Gable | Sept. 26, 1944 |
| 2,445,464 | Ailinger | July 20, 1948 |

FOREIGN PATENTS

| Number | Country | Date |
|---|---|---|
| 28,603 | Great Britain | Dec. 11, 1912 |

OTHER REFERENCES

Pages 19–29 of "Special Slide Rules" by J. N. Arnold, published in September 1933 by Purdue University, La Fayette, Indiana.